US007991201B2

(12) United States Patent
Bous et al.

(10) Patent No.: US 7,991,201 B2
(45) Date of Patent: Aug. 2, 2011

(54) METHODS AND SYSTEMS FOR PROTECTION OF IDENTITY (75) Inventors: Joseph M. Bous, Great Falls, VA (US); Gabriel A. Assaad, Washington, DC (US); James Marciano, San Diego, CA (US)

(73) Assignee: Privacy Card, LLC, Washington, DC (US)

( * ) Notice: Subject to any disclaimer, the term of this patent is extended or adjusted under 35 U.S.C. 154(b) by 0 days.

(21) Appl. No.: 12/632,626

(22) Filed: Dec. 7, 2009

(65) Prior Publication Data

US 2010/0169210 A1 Jul. 1, 2010

Related U.S. Application Data

(63) Continuation of application No. 11/227,620, filed on Sep. 16, 2005, now Pat. No. 7,689,007.

(51) Int. Cl.
*G06K 9/00* (2006.01)
(52) U.S. Cl. ........................................ 382/115
(58) Field of Classification Search .................. 382/115, 382/218, 209; 705/39, 44
See application file for complete search history.

(56) References Cited

U.S. PATENT DOCUMENTS

| 6,456,984 | B1 | 9/2002 | Demoff et al. ............ 705/40 |
|---|---|---|---|
| 6,636,833 | B1 | 10/2003 | Flitcroft et al. ........... 705/1 |
| 6,839,692 | B2 | 1/2005 | Carrott et al. ............ 705/64 |
| 7,006,986 | B1 | 2/2006 | Sines et al. ............... 705/26 |
| 7,277,891 | B2 | 10/2007 | Howard et al. ........... 707/100 |
| 7,370,012 | B2 | 5/2008 | Karns et al. ............. 705/39 |
| 7,392,388 | B2 | 6/2008 | Keech .................... 713/170 |
| 2001/0029496 | A1* | 10/2001 | Otto et al. ............... 705/74 |
| 2001/0044785 | A1 | 11/2001 | Stolfo et al. ............. 705/74 |
| 2002/0035686 | A1 | 3/2002 | Creighton et al. ........ 713/156 |
| 2002/0116341 | A1 | 8/2002 | Hogan et al. ............ 705/64 |
| 2003/0028481 | A1 | 2/2003 | Flitcroft et al. .......... 705/39 |
| 2003/0050787 | A1* | 3/2003 | Hornsby et al. .......... 705/1 |
| 2003/0097270 | A1* | 5/2003 | Musselwhite et al. ..... 705/1 |
| 2003/0187787 | A1 | 10/2003 | Freund ................... 705/39 |
| 2004/0254893 | A1 | 12/2004 | Tsuei et al. ............. 705/74 |
| 2005/0246550 | A1 | 11/2005 | Orbke et al. ............ 713/182 |
| 2006/0064380 | A1* | 3/2006 | Zukerman ............... 705/44 |
| 2006/0069611 | A1 | 3/2006 | Litt et al. ............... 705/14 |

* cited by examiner

*Primary Examiner* — Daniel G Mariam
(74) *Attorney, Agent, or Firm* — Morgan, Lewis & Bockius LLP (57) ABSTRACT

The present invention relates to a method to the creation and management of a secondary identification to avoid identify theft. Identity theft may occur over the internet, the purchase of goods and services by credit, and many other forms not yet known. The present invention creates a secondary identification for a person by creating one or more of the following secondary identifications which include a secondary email address, a secondary postal address, a secondary phone number, and any other identifying secondary information. The present invention describes methods and systems to create a secondary identification. Further, the present invention may be used to create a credit card containing the requestor's secondary identification.

6 Claims, 8 Drawing Sheets

Process for Creating Secondary ID

FIG. 1

Figure 2: Secondary ID

Figure 3: Process for Creating Secondary ID

Figure 4: Subprocess for Mail

Figure 5: Subprocess for Email

Figure 6: Subprocess for Phone Number

Figure 7: Privacy Card

Figure 8: Privacy Card - Issuing of Credit

METHODS AND SYSTEMS FOR PROTECTION OF IDENTITY

The present invention is a continuation application of Application Ser. No. 11/227,620, filed on Sep. 16, 2005 now U.S. Pat. No. 7,689,007, which is hereby incorporated by reference.

FIELD OF THE INVENTION

The present invention relates to methods and systems for protecting a person's. More specifically, the invention relates to methods and systems that employ a computer network which automatically processes, stores and manages a person's identity at the request of the user and protects that identity in transactions.

BACKGROUND OF THE INVENTION

Identity theft has become a growing epidemic in the United States and in the rest of the world. Many people have become victim to identity theft which resulted in the loss of money, time, credit and privacy. The incidence of identity theft increased 20% in 2001-2002 and 80% in 2002. Identity theft costs individuals and businesses billions of dollars each year. Yet there is no method or system to stop it.

Nearly 85% of all victims find out about their identity theft case in a negative manner. Only 15% of victims find out due to a proactive action taken by a business. The average time spent by victims is about 600 hours, an increase of more than 300% over previous studies. And it is taking far longer to eliminate negative information from credit reports. The emotional impact of identity theft has been found to parallel that of victims of violent crime.

In 2003, the Federal Trade Commission (FTC) found that over twenty-seven million Americans had been victims of identity theft in the previous five year, including approximately ten million people, or 4.6% of the population, in 2002.

In 2002, over three million consumers or 1.5% of the population discovered that new accounts had been opened, and other frauds such as renting an apartment or home, obtaining medical care or employment, had been committed in their name. Over six million had experienced their existing accounts compromised by an identity theft. A staggering ten million individuals were victims of identity theft.

Fifty-two percent of all ID theft victims, approximately 5 million people in the last year, discovered that they were victims of identity theft by monitoring their accounts.

In 2002, identity theft losses to businesses and financial institutions totaled over forty-seven billion dollars and consumer victims reported five billion dollars in out-of-pocket expenses. In those cases, the loss to businesses and financial institutions was $10,200 per victim totaling $32.9 billion. Individual victims lost an average of $1,180 for a total of $3.8 billion.

Where the thieves solely used a victim's established accounts, the loss to businesses was $2,100 per victim totaling $14.0 billion. For all forms of identity theft, the loss to business was $4,800 and the loss to consumers was $500, on average.

The major concern of identity theft is the ease with which it occurs. Typically, identity thieves obtain the Social Security number and name of an individual. That's often all that is needed for identity theft. In addition, they also might obtain credit card numbers and hijack existing accounts. Other pieces of information useful to identity thieves are dates of birth, mother's maiden name, and driver's license number.

Many of these pieces of information can be obtained by simply stealing a person's wallet or going through a person's garbage. In addition, many identity thieves are going through the Internet and obtaining the information needed to obtain a person's identity. Many internet sites require registration which includes personal information.

Furthermore, these companies and organizations collect the information and store the information in a database that could be sold or traded to other entities. As time goes on, a person's personal information could be obtained by hundreds of businesses and entities. A hacker or disgruntled employee may at any point obtain that information for the purpose of identity theft.

In addition to online identity theft, the use of credit cards at merchant stores is another avenue of identity theft. In providing credit card information, the credit card holder also provides the name, billing address, and other information an identity thief can use to assume someone's identity.

There are many forms of identify theft, the most common form of identity theft is financial identity theft. This is when someone obtains the Social Security number (SSN) and perhaps a few other pieces of information about an individual, and uses that information to impersonate them and obtain credit in their name. The imposter might apply for credit, rent an apartment, get phone service, buy a car—and then not pay the bills, giving the victim a bad credit rating. Victims must then spend months and typically years regaining their financial health.

Another form of identity theft is criminal identity theft. Here, the imposter in this crime provides the victim's information instead of his or her own when stopped by law enforcement. Eventually when the warrant for arrest is issued it is in the name of the person issued the citation-yours.

Yet another form of identity theft is identity cloning. In this crime the imposter uses the victim's information to establish a new life. They work and live as you. Examples: Illegal aliens, criminals avoiding warrants, people hiding from abusive situations or becoming a "new person" to leave behind a poor financial history.

Finally, there is business or commercial identity theft. Businesses are also victims of identity theft. Typically the perpetrator gets credit cards or checking accounts in the name of the business. The business finds out when unhappy suppliers send collection notices or their business rating score is affected.

Currently, there exists no efficient process to eliminate identity theft from occurring. In fact, there exists very few and limited laws to protect consumers from identity theft. From a legislative perspective, one of the main problems is that no federal law governs—or even limits—the use or disclosure of someone's SSN among private entities. This leaves private companies free to deny anyone credit, service or membership for refusing to furnish a SSN. Simultaneously, and contrary to popular belief, the Social Security Administration has no power to control how private entities use their account numbers.

The result is an extremely vulnerable system that puts the entire burden of protection on the consumer. With no power to control how their SSN is kept, used or distributed, many are left simply to sit and wait for an ID thief to strike.

Unfortunately, there is a gaping hole under existing law for preventing ID theft schemes. Although fraudulently using an individual's identity information is a crime, the after-the-fact approach currently in place does little to protect consumers from identity theft before it occurs.

Current identity theft "solutions" offer help to consumers after the crime has occurred. Businesses—typically credit agencies—offer identity theft insurance which include monetary reimbursement for financial losses, time lost, and attorney's fees. These businesses and entities also offer legal assistance or guidelines for the consumer in obtaining his or her identity back and to stop the use of their identity by others. There are no businesses or entities that offer services to individuals to help protect them from identity theft before it occurs.

Further, an individual voluntarily gives out their personal data in the course of the day: from registering internet domains to obtaining credit to purchasing items over the internet, in person, or by phone. To function in society, one must provide this information.

Once a person's personal information is out there, there is no getting it back. Many companies share information and data and, as a result, we are continually bombarded by spam, mail solicitations, numerous marketing calls and all other unwanted contacts by organizations simply because, at some point, we wanted to buy something!

In short, it would be an advancement in the art of privacy protection to provide methods and systems which would greatly reduce the act of identity theft as well as other forms of annoyances caused by the release of a person's personal information, while maintaining the confidentiality and security of the individual. More specifically, to control a person's identity while using the internet, credit card, or in any transaction in which a person's identity might be obtained.

SUMMARY OF THE INVENTION

The above-mentioned needs are encompassed in the present invention in which processes and systems, and software implementing these processes, greatly protect a person's identity. Typical individuals provide personal data in many situations as stated previously. In many cases, in order to conduct business or to apply for a service, an individual must provide his personal data. The present invention greatly reduces the harm from providing such personal data, such harm as identity theft, unwanted marketing calls, spam, and so on.

The processes and systems according to the present invention are advantageously implemented using a plurality of computers and/or servers that communicate together, typically a computer network or system. In some cases, human assistance may be necessary to facilitate the process and system.

The inventive processes and systems that enable a requestor to obtain a secondary identification employ one or more centralized data processing centers, comprising one or more computers or computer systems, in communication with remote computers or computer systems employed by the various requesters. The data processing center is also in electronic communication with providers from whom a secondary identification is to be requested. To help ensure compliance, the data processing center may electronically communicate with one or more telephone calling centers that employ individuals assigned to contact a specific requestor while that requestor receives an electronic communication from the data processing center. The data processing center may also be in electronic communication with a data conversion device, such as a scanner or fax machine, used to convert a paper record into an appropriate electronic form.

The inventive processes and systems generally include four basic steps and subsystems. First, a request for a secondary identification electronically received from a requestor by a data processing center. Second, the data processing center electronically transmits the request to the appropriate subsystems. Third, the sub-systems produce a secondary identification. Fourth, the data processing center matches up the secondary identification with the primary identification and the corresponding request, creates a copy of the secondary identification, and transmits the copy of the secondary identification to the requestor via a secured connection.

In the first step and subsystem, the initial request from the requestor to the data processing system is typically generated by means of a computerized request form using software designed to generate standard forms for that requestor. As the request form is generated, a request identification code, such as a serial number, is generated for each request. After the data processing center receives the request, it performs sub-processes to create a secondary identification.

In the second step and subsystem, the data processing center transmits each request to the one or more of the requested services such as the secondary email, secondary postal mail and secondary phone services.

The data processing center may also transmit the request to a quality control center at or about the same time it transmits the request to the services, if needed. A designated individual within the quality control center then places a telephone call to, or otherwise initiates communication with the service, preferably to an individual in close proximity to the computer, fax machine or other device that receives the request.

In the third step and subsystem, the secondary identification is created by sub-processes as described below. The sub-processes include but are not limited to the creation of a secondary identification of a secondary postal address, the creation of a secondary email address, and the creation and obtaining a secondary phone number. In the above-mentioned sub-processes, one or more than one may be requested by the requestor. The data processing center communicates with the requestor in obtaining and managing the secondary identification, and associating the requestor's actual or primary identification and the secondary identification.

Further, the data processing center also will store the requestor's primary identification and secondary identification in a secure network to protect the information from outside tapping. In addition, the database created will be accessible to government agencies as required by law via secure connection.

In the fourth step, the data processing center transmits an electronic or facsimile copy of the requested secondary identification to the requester.

In one embodiment of the present invention, the secondary identification will be created for the requester for purposes of protecting the requestor's identity from identity thieves and spammers. The requestor, while surfing the internet, will be protected from unwanted advertisement, spam, and solicitation to their email address, home address and/or phone. The communications, spam or solicitations by electronic means will be sent to the requestor's secondary email address, which will be automatically forwarded to the requester's primary email address or deleted. At the requester's choosing, a new secondary email account may be created and the previous secondary email terminated. The purpose of the above is to protect the requester's email address from the flooding of his primary email address once his secondary email address has been compromised. Further, all communications, solicitations and/or junk mail sent by postal mail or express mail service will be sent to the requestor's secondary postal address at a post office box. The requestor may request the mail to be forwarded to his primary postal address or to be discarded or to be scanned and forwarded to his primary email address. Finally, any phone communication and/or solicitation will be sent to the requestor's secondary phone number which will consist of a voicemail system that will be accessible by the requestor, or, if the requestor so chooses, to be forward via wave file or similar format to the requestor's primary email address, or deleted.

In another embodiment of the present invention, the above discussed components will be used in the issuance of a credit card or privacy credit card. A requestor may choose to obtain a credit card with privacy protection, the requestor's primary identification is sent to a credit issuing bank in which the requestor is either approved or rejected for credit. If the requestor is approved for credit, the requestor is issued with a credit card. Concurrently, the requestor is given a secondary identification as discussed above. Once a requestor's secondary identification is created, the data processing center swaps the requestor's primary identification with the secondary identification in the issuing bank's database. If the issuing bank's database is programmed to store both the secondary identification, and primary identification, then both will be stored with the bank. Otherwise, the issuing bank will store the secondary identification with access to the data processing center to obtain the requestor's primary identification.

In addition, the credit card will consist of a transaction privacy feature in which the monthly statement will be sent by electronic means with the option of either only disclosing the total sum due or all transactions in the billing period. The requestor may enter into his credit card account and obtain the transaction history of his credit card for any billing period. The purpose of this feature is to obtain privacy in the requestor's transactions from other sources.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth below.

DETAILED DESCRIPTION OF THE INVENTION

In the following detailed description and in several figures of the drawings, like elements are identified with like reference numerals.

I. Introduction and Definitions

The present invention relates to processes and systems for requesting and obtaining a secondary identification ($2^{nd}$ ID), as well as software for implementing these processes. Such processes and systems greatly streamline the ability to obtain a secondary identification on behalf of a requestor. The process and systems according to the present invention are advantageously implemented using a set of computers which communicate together, typically a computer network or system. Such communication may be by direct link, by the Internet, or a combination thereof.

Some of the tasks may require human assistance to locate, process, and send certain information, which is then further processed by means of the computer network, typically a data processing center.

The term "data processing center" shall refer to a computer system that is essentially a computerized clearing house for receiving and processing requests, communicating the requests with other entities, receiving data, and then sending information to one or more parties authorized to receive the information. The data processing center may be located at a single location or constitute a system of computers at different locations that are networked together. While preferably computerized and automated as much as possible, the functions carried out by the data processing center may require some human intervention.

The term "requestor" shall refer to any party that is making a request for a secondary identification or a privacy card. There is, however, no restriction as to who may constitute a "requestor". Thus, the requestor may be the party actually making the request, or an employee, agent, or affiliate of the requesting party.

The term "issuing bank" shall refer to any individual or entity that may issue a credit card.

The term "access to", in the context of a provider having, "access" to a record, shall refer to any situation in which an agency has or may obtain access to a requested primary identification. Access may be actual or prospective.

II. Systems for Requesting and Providing a Secondary Identification

A. Basic Operating System.

The present invention extends to methods and systems for requesting and obtaining a secondary identification and/or a privacy credit card. By way of general background, the embodiments of the present invention may comprise or be implemented, at least in part, using special purpose or general purpose computers including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media may include random access memory (RAM), read only memory (ROM), electrically erasable programmable read only memory (EEPROM), compact disc read only memory (CD-ROM), digital video disc (DVD), or other optical disk storage, magnetic disk storage or other magnetic storage devices, or any other medium which can be used to carry or store desired program codes in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium, as would be any medium for transmitting a propagated signal. Combinations of the above should also be included within the scope of computer-readable media. In addition to computer-readable media, computer-executable instructions or data structures may be partly or wholly provided to or sent from a computer in the form of a propagated wave, typically by means of one or more communications connections between two or more computers. Computer-executable instructions comprise, for example, instructions and data which cause a general purpose computer, special purpose computer, or special purpose processing device to perform a certain function or group of functions.

Figure 1:
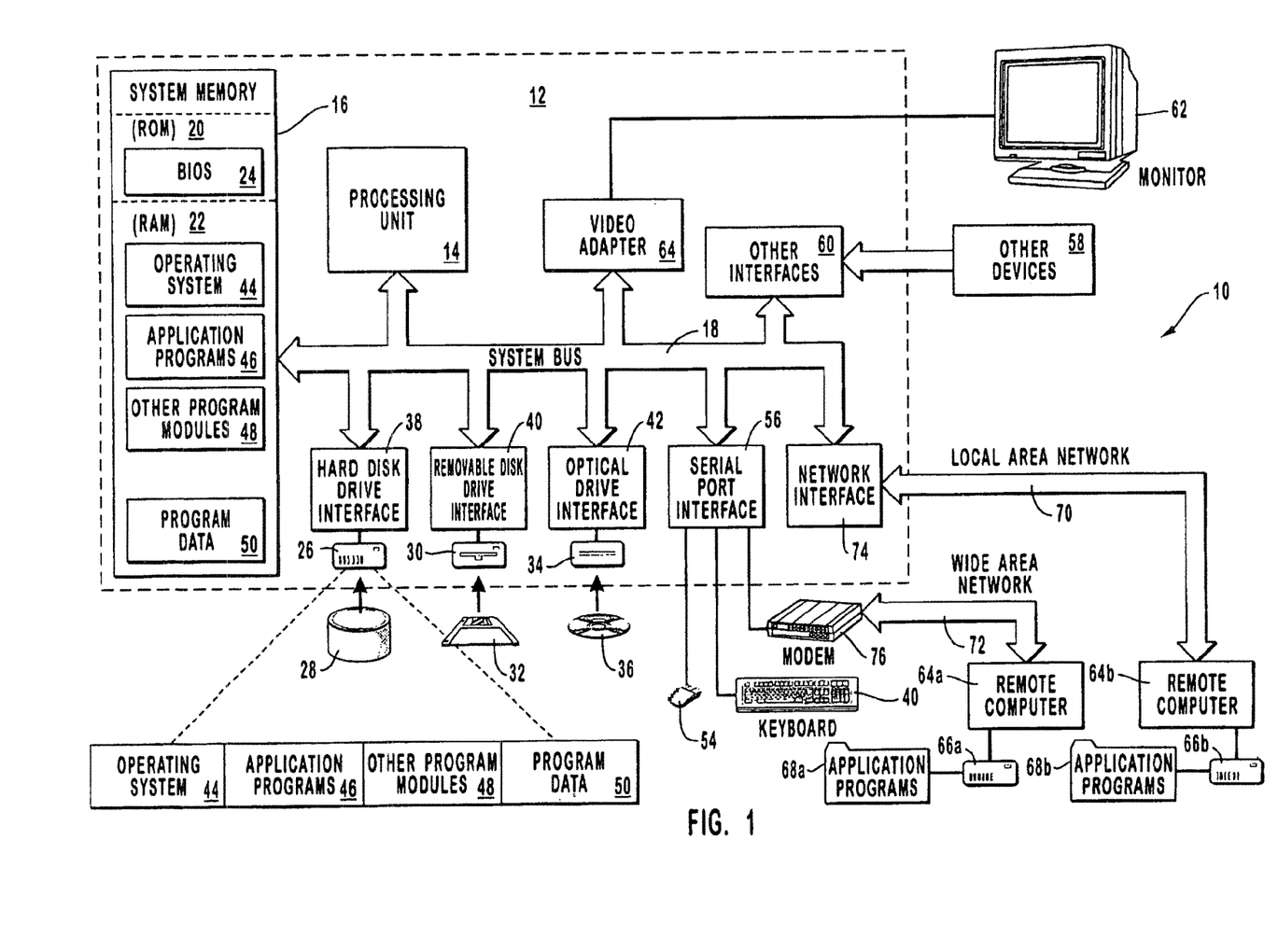
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc., that perform particular tasks or implement particular abstract data types. Computer-executable instructions, associated data structures, and program modules represent examples of the program-code means for executing steps of the methods disclosed herein. The particular sequences of such executable instructions or associated data structures represent examples of corresponding acts for implementing the functions described in such steps.

Those skilled in the art will appreciate that the invention may be practiced in network computing environments with many types of computer system configurations, including personal computers (PCs), hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer system 10, which, in its broadest sense, includes components hardwired or otherwise associated together within a conventional computer box, bundle, or subsystem illustrated by item number 12, together with user interface, communications, and other devices and features located externally to, physically separated from, or otherwise spaced apart relative to the computer bundle or subsystem 12. By way of example, and not limitation, a conventional computer bundle or subsystem 12 includes a processing unit 14, a system memory 16, and a system bus 18 that couples various system components including the system memory 16 to the processing unit 14. The system bus 18 may be any of several types of bus structures including a memory bus or memory controller, a peripheral bus, and a local bus using any of a variety of bus architectures. The system memory includes read only memory (ROM) 20 and random access memory (RAM) 22. A basic input/output system (BIOS) 24, containing the basic routines that help transfer information between elements within the computer system 10, such as during start-up, may be stored in ROM 20.

The computer system 10, typically the computer bundle or subsystem 12, may also include a magnetic hard disk drive 26 for reading from and writing to a magnetic hard disk 28, a magnetic disk drive 30 for reading from or writing to a removable magnetic storage device 32, and an optical disk drive 34 for reading from or writing to a removable optical disk 36 such as a CD-ROM, digital versatile disk, a laser disk, or other optical media. The magnetic hard disk drive 26, magnetic disk drive 30, and optical disk drive 34 are connected to the system bus 18 by a hard disk drive interface 38, a magnetic disk drive-interface 40, and an optical drive interface 42, respectively. The drives and their associated computer-readable media provide nonvolatile storage of computer-executable instructions, data structures, program modules, and other data for the computer 10. Although the exemplary environment described herein employs a magnetic hard disk 28, a removable magnetic disk 32, and a removable optical disk 36, other types of computer readable media for storing data can be used, including magnetic cassettes, flash memory cards, Bernoulli cartridges, RAMs, ROMs, and the like. For purposes of the specification and the appended claims, the term "computer readable medium" may either include one or a plurality of computer readable media, working alone or independently, so long as they singly or collectively form part of a recognizable system for carrying out the processes of the invention.

Program code comprising one or more program modules may be stored on the hard disk 28, magnetic disk 32, optical disk 36, ROM 20, or RAM 22, including an operating system 44, one or more application programs 46, other program modules 48, and program data 50. A user may enter commands and information into the computer bundle or subsystem 12 by means of a keyboard 52, a pointing device (e.g., "mouse") 54, or other input devices (not shown), such as a microphone, joy stick, game pad, satellite dish, scanner, video player, camera, or the like. These and other input devices are often connected to the processing unit 14 through a serial port interface 56 coupled to the system bus 18. Alternatively, these and other devices 58 may be connected by other interfaces 60, such as a parallel port, a sound adaptor, a decoder, a game port or a universal serial bus (USB). Non-exhaustive examples of "other devices 58" include scanners, bar code readers, external volatile and nonvolatile memory or storage devices, audio devices, video devices, and microphones. A monitor 62 or another display device is also connected to the system bus 18 via an interface, such as a video adapter 64. In addition to the monitor 62, computers typically include other output devices (generally depicted as "other devices 58"), such as speakers and printers.

The computer system 10 may operate in or involve a networked environment using logical connections to one or more remote computers, such as remote computers 64a and 64b. Remote computers 64a and 64b may each be another personal computer, a server, a router, a network PC, a peer device or other common network node, and typically include many or all of the elements described above relative to the computer system 10, although only memory storage devices 66a and 66b and their associated application programs 68a and 68b have been illustrated in FIG. 1. The logical connections depicted in FIG. 1 include a local area network (LAN) 70 and a wide area network (WAN) 72 that are presented here by way of example and not limitation. Such networking environments are commonplace in office-wide or enterprise-wide computer networks, intranets, and the global computer network or "Internet".

When used in a LAN networking environment, the computer bundle or subsystem 12 is connected to the local network 70 through a network interface or adapter 74. When used in a WAN networking environment, the computer bundle or subsystem 12 may include a modem 76, a wireless link, or other means for establishing communications over the wide area network 72, such as the Internet. The modem 76, which may be internal or external, is typically connected to the system bus 18 via the serial port interface 56. In a networked environment, program modules depicted relative to the computer bundle or subsystem 12, or portions thereof, may be stored in a remote memory storage device (e.g., remote storage devices 66a and 66b). It will be appreciated that the network connections shown are exemplary, and other means of establishing communications over wide area network 72 may be used.

Although computer components are commonly arranged in the form depicted in FIG. 1, with some components of the computer system 10 physically located within, and other components physically located outside, the computer bundle or subsystem 12, it will readily be appreciated that the terms "computer" and "computer system" should be broadly understood to include any or all of the foregoing components in any desired configuration which facilitate carrying out the inventive methods and systems disclosed herein. The terms "computer" and "computer system" may therefore include other common features or components not depicted in FIG. 1.

In addition to the foregoing computer system, the inventive networks may include components such as fax machines, scanners, printers, copy machines and any other device or component that may be necessary to facilitate the retrieval and copying of the requested records. One level of human intervention may also be necessary to process or carry out certain steps such as entering into a transaction between the requester and the person authorizing the release of the records, signing of the authorization form by the client or other authorized person, one or more agents of the provider who receives and processes the request for the record, and the person who ultimately reviews the record to determine whether the transaction dependant on the record should go forward. To help ensure compliance, one or more calling centers in communication with the data processing center may be assigned the task of initiating a personal communication, such as a telephone call, with a representative of the provider that has access to the requested record. In short, the exemplary descriptions of computer systems and other hardware are given by way of example only and not by limitation.

B. The Data Processing Center.

The systems according to the present invention for requesting, obtaining, and providing a secondary identification are controlled or directed by one or more data processing centers in communication with one or more postal centers, one or more phone companies, one or more email service providers, optionally, one or more call centers. The centralized function or role of the data processing center according to the present invention is illustrated in FIG. 2.

Figure 2:
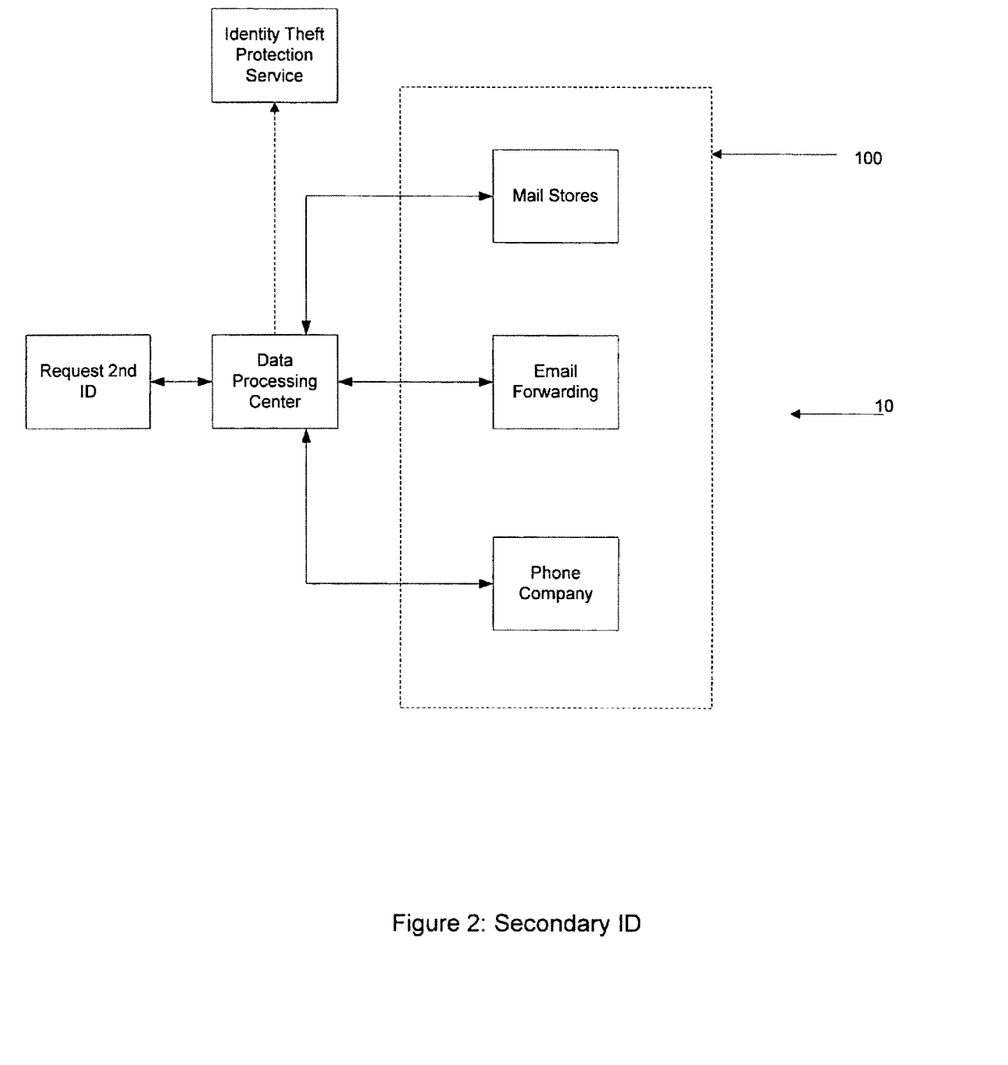
FIG. 2 is a schematic diagram illustrating the exemplary system or network for processing requests for a secondary identification according to the invention.

As depicted in FIG. 2, a system for processing requests for a secondary identification according to the present invention includes, as its main information and control hub, one or more data processing centers 102. The data processing center 102 is substantially or wholly automated by means of one or more computer systems that are able to receive and analyze information, make decisions, and send information as needed to carry out the processes disclosed herein. The data processing center 102 is in communication with one or more requestors 104, and one or more providers 200. The data processing center 102 may include any hardware peripheral to the computer system that will facilitate the process of requesting, obtaining, and providing a secondary identification. The data processing center 102 may involve human intervention to carry out one or more of the tasks described herein.

In a typical scenario, a requestor 104 enters a request which requires the obtaining, processing, and delivery of a secondary identification to the requestor. For the requestor to obtain a secondary identification, the requestor must provide his personal identification such as name, postal address, and/or email address. The means for generating and sending the request will typically include a computer, or one or more optional devices such as a printer, an electronic signature device, a fax machine, a scanner and the like.

The request is typically generated and sent in electronic form, such as in the form of a hypertext markup language (HTML) document or by means of an application program interface (API), discussed more fully below. The request 150 may either be digitally signed, and therefore in digital form from the outset, or it may be a manually signed document that is scanned, digitized, and sent as a graphic file from the requestor 104 to the data processing center 102 (e.g., by means of a fax machine).

The means of the services 200 for receiving the bundled request, or one or more of the individual components thereof, may include one or more fax machine, telephones, computers, hand-held telecommunications devices, or other communication receiving means. At present, a typical means for receiving the request is a computer, together with a telephone for optional receipt of a telephone call from the call center 100. In order to streamline the process by which the data processing center 102 is able to communicate or transmit the request to the services 200, a service interface module may be advantageously employed. The provider interface module allows service providers 200 to log in on a regular basis and determine if and what services have been requested through the data processing center 102. This potentially eliminates the need for phone calls from the call center 114.

The call center 114 may include one or more fax machines, computers, telephones, or other means for receiving the request from the data processing center 102. The call center 100 typically employs a number of individuals who are assigned the task of providing secondary notification 102 to each service 200 to ensure compliance of the request 150 by the service providers 200. The call center advantageously includes a computerized system for assigning each request to a particular individual caller, preferably one having a pre-established relationship with the service provider 200 to which the request 150 has been or will be sent. Of course, it is certainly within the scope of the invention to provide any system that assigns any caller to any particular provider as desired.

The data processing center 102 advantageously includes storage means, such as one or more magnetic disks or tapes, volatile and nonvolatile memory devices, optical storage devices, and the like for storing the encrypted copy of the secondary identification and personal identification, preferably in the form of a searchable digital database for later access and retrieval. In the case where the service provider 200 can communicate with the data processing center 102 by means of a provider interface module, the service provider 200 may be able to determine whether a requested service has already been copied and stored within the digital database. Moreover, the searchable digital database may be made accessible to the service provider 200 to allow the service provider 200 to quickly pull up a the personal identification and the secondary identification.

The data processing center 102 includes means for sending a secure copy 152 of the secondary identification to the requestor 104 and/or other authorized party such as identity theft protection service 106, or such as one or more networked computers. The data processing center may also include means for sending a tangible copy 152 of the requested secondary identification to the requestor 104 or other authorized party, such as one or more fax machines or a conventional mail carrier.

In order to provide the ability for a requestor to periodically check the status of a particular request, a status check module may be provided by the data processing center 102. The status check module may also allow a requestor to determine if there is a Problem or informality that might be causing delay in processing the request, such as the need to supply or obtain additional information.

Figure 3:
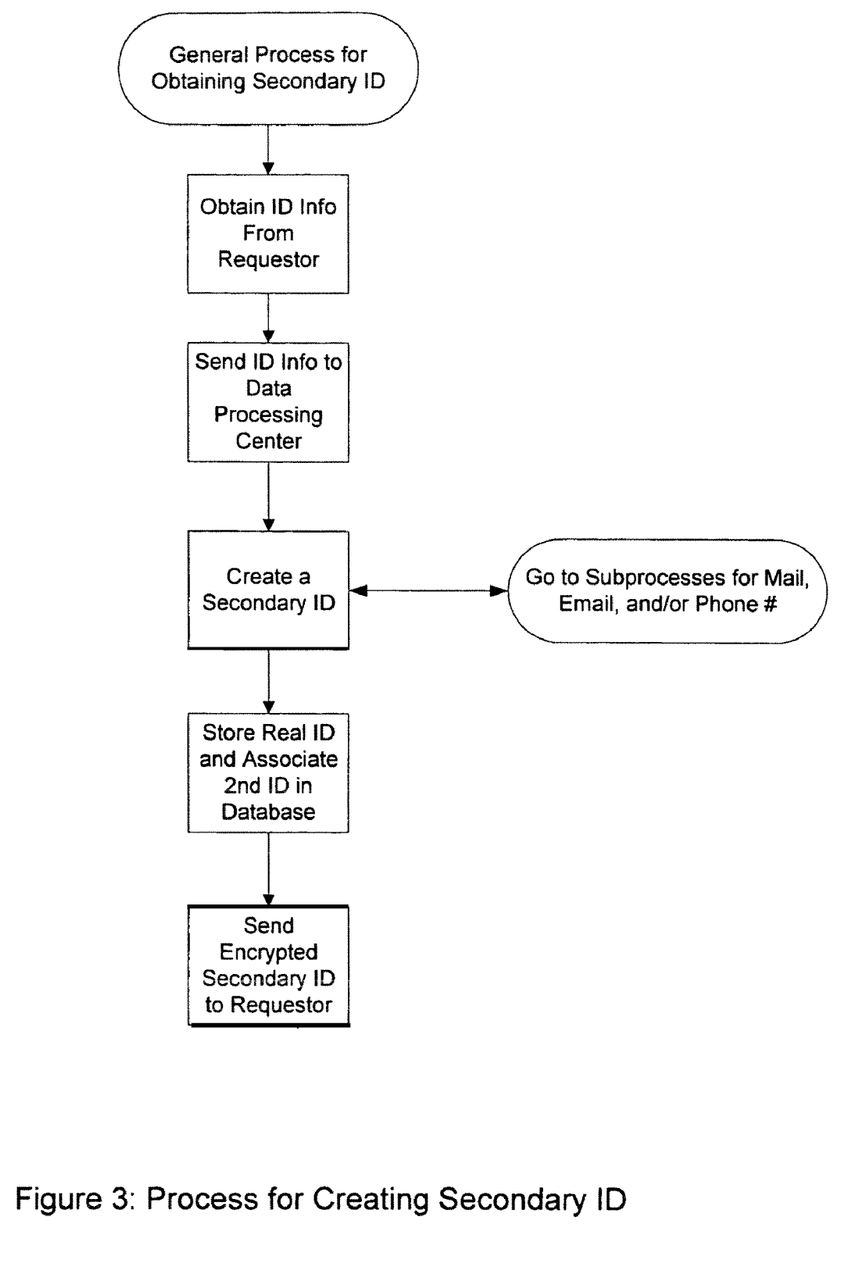
FIG. 3 is a flow diagram depicting an exemplary process by which requests for a secondary identification may be processed.

As illustrated in FIG. 3, a flow diagram depicting an exemplary process 210 for obtaining a secondary identification from the primary identification of a requestor. In a first step, a requestor generates a request for a secondary identification. The requestor submits the requestor's name, email address, postal address and/or phone number to the data processing center 102. The data processor then performs the sub-processes that will be described below to obtain a secondary postal address, a secondary email, a secondary phone number and/or any other service.

After obtaining a secondary postal address, a secondary email, secondary phone number and/or other secondary identification from the sub-processes, the data processing center will store the secondary identification information along with the requestor's primary identification information in a secure system. The data process center 102 then will send the secondary identification information to the requestor via secure connection.

Figure 4:
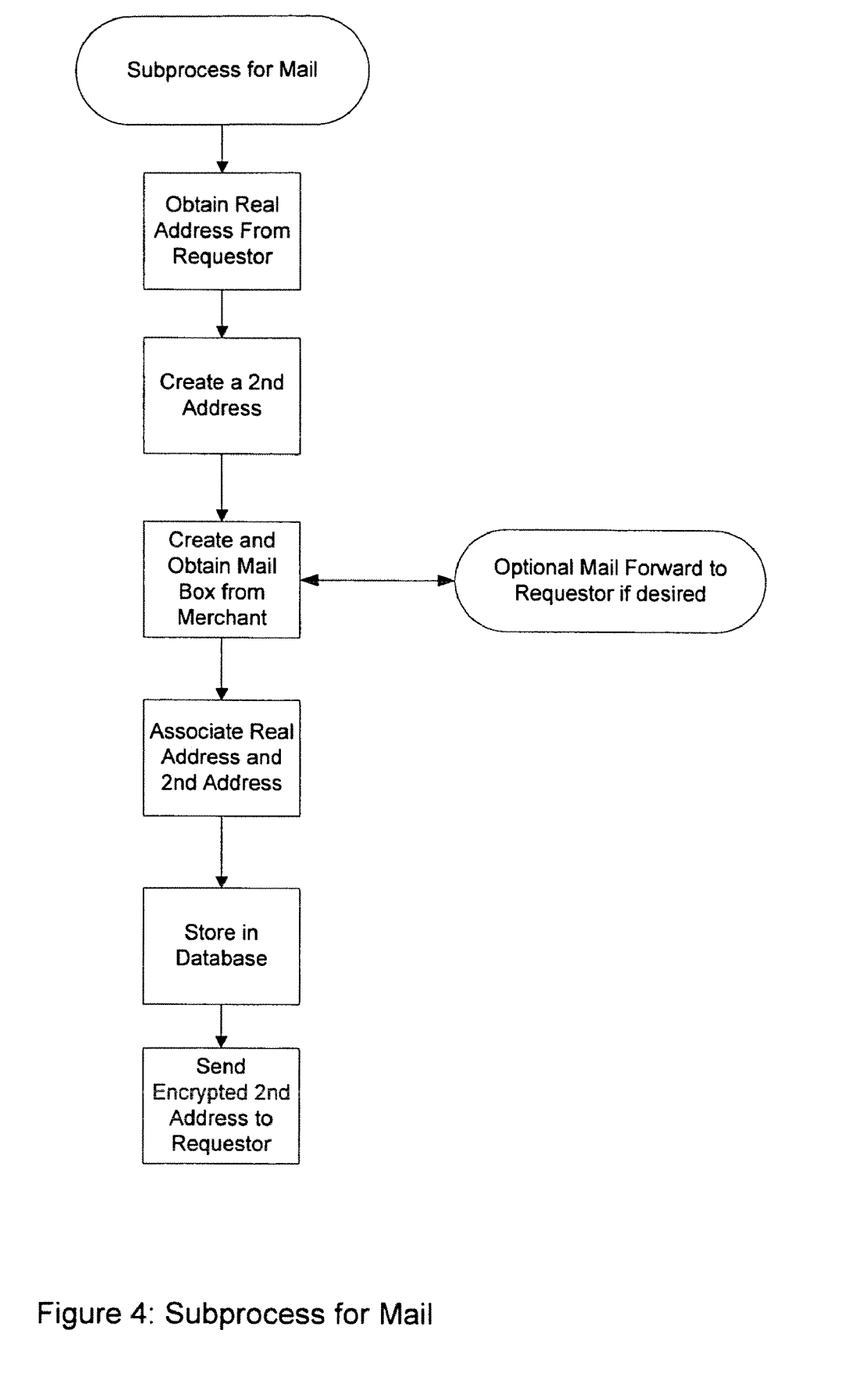
FIG. 4 is a flow diagram depicting an exemplary sub process for generating and obtaining a secondary address and mailbox.

As illustrated in FIG. 4, a flow diagram depicting an exemplary sub-process 220 of obtaining a secondary postal address for a requester from a primary postal address obtained from the requester. In a first step, the data processing center obtains the primary postal address from the requester. The data processing center in the next step obtains a postal address from a mail service provider such as a public postal service or a private postal service. Examples of private postal services are United Parcel Service (UPS) or Mailbox Etc. In obtaining a secondary postal address for the requestor, the data processing center 102 performs an algorithm to determine an appropriate postal address convenient to the requestor.

The data processing center 102 obtains a secondary postal address by obtaining a post office box at one of the above-mentioned postal centers. The requestor may determine the size of the post office box and may also request an option of automatic forwarding of mail from their secondary postal address to their primary postal address. Another option for the requestor is to authorize the post office box provider to periodically empty the post office box. In addition, the requestor may authorize the scanning of the mail which will be forwarded to the requestor's primary email address.

The next step in FIG. 4, the data processing center 102 stores the secondary postal address of the requestor along with primary postal address. The data processing center 102 then sends the secondary postal address information to the requestor via a secure connection and/or process.

Figure 5:
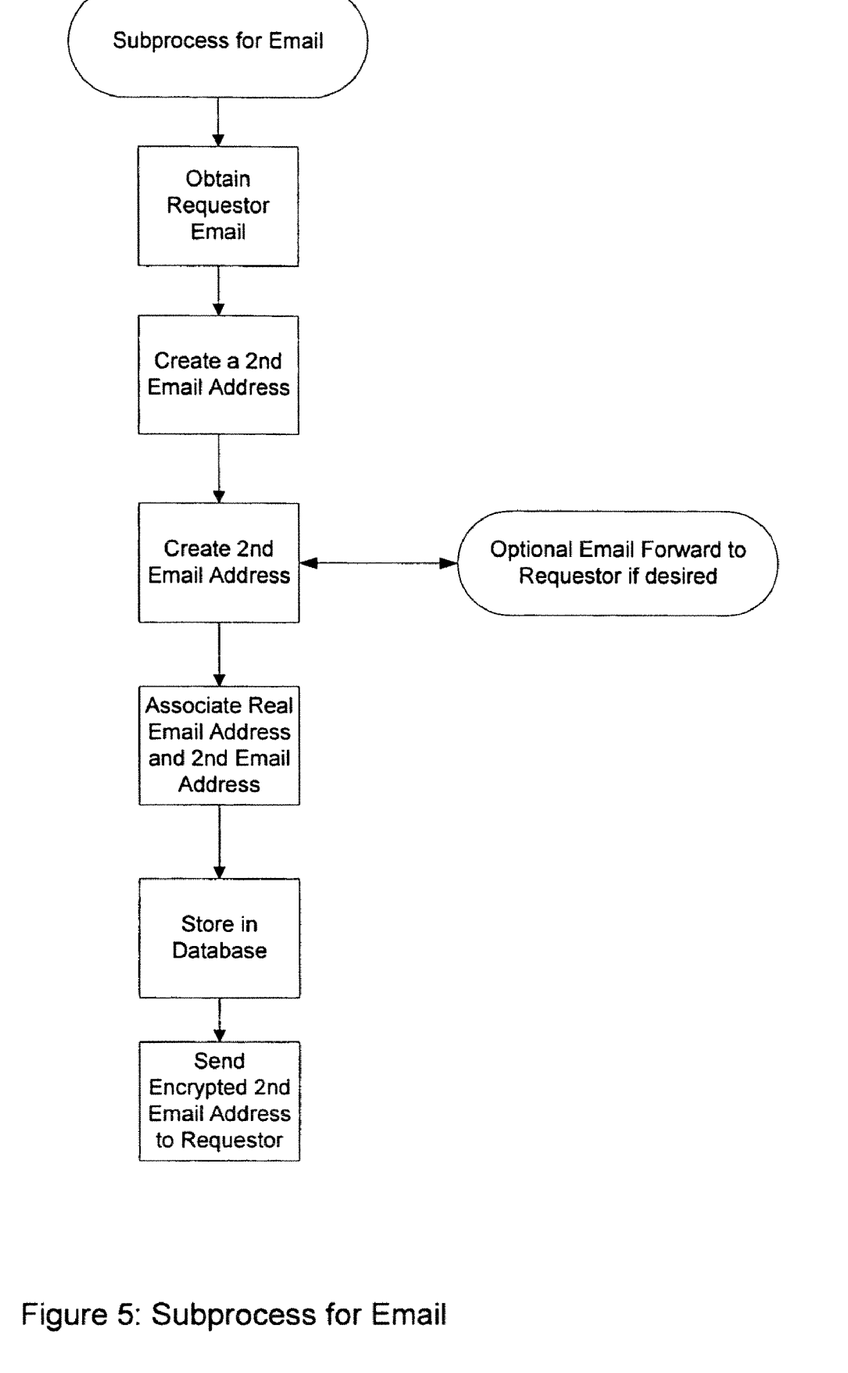
FIG. 5 is a flow diagram depicting an exemplary sub process for generating and obtaining a secondary email address.

As illustrated in FIG. 5, a flow diagram depicting an exemplary sub-process of obtaining a secondary email for a requester. In the first step, a requestor requests a secondary email from the data processing center 102. The data processing center 102 obtains a secondary email from an email database and server. The data processing center 102 associates the secondary email with the primary email. The secondary email address is sent to the requestor via a secure connection and/or process.

Figure 6:
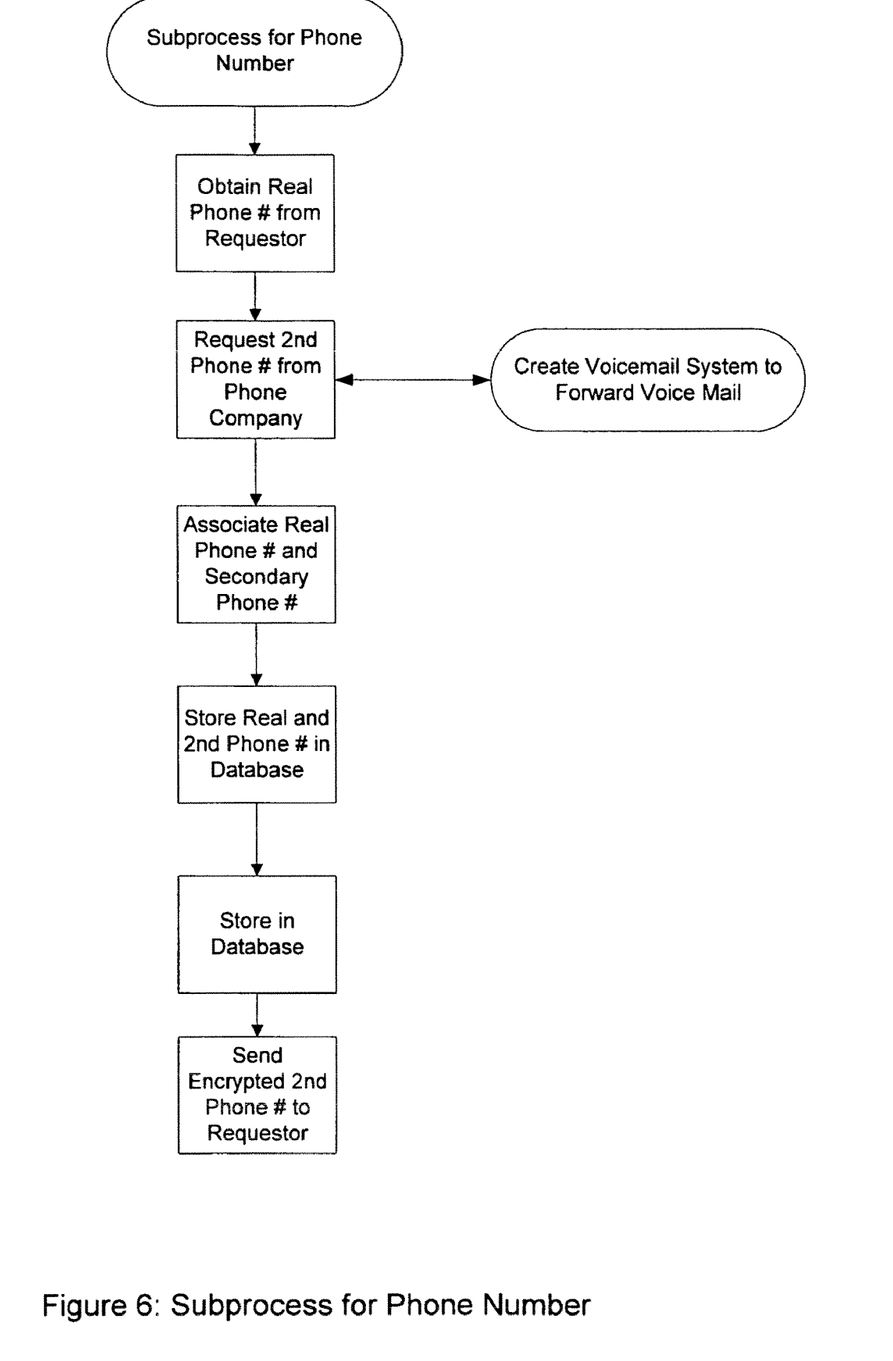
FIG. 6 is a flow diagram depicting an exemplary sub process for generating and obtaining a secondary phone number.

As illustrated in FIG. 6, a flow diagram depicting an exemplary sub-process 220 of obtaining a secondary phone number for a requester. In a first step, a requestor requests a secondary phone number from the date processing center 102. The data processing center then requests a phone number from a telephone service provider. The data processing center 102 then registers the secondary phone number. The requestor can either request the creation of a voicemail system to retrieve messages or the automatic forwarding of voicemails to the requestor's computer via email. The voicemail messages will be sent in a wave format or similar format. The data processing center 102 then sends a secondary phone number to the requestor via secure connection and/or process.

If the creation of a secondary identification is in use for purpose of obtaining a privacy credit card, the data processing center 102 will require a primary telephone number from the requester.

The above-mentioned services in FIGS. 4, 5, and 6 are performed simultaneously or individually depending on the services requested by the requestor. Further, the secondary identification which includes the secondary email, postal address, and phone number, may be sent to the requestor in one or more transactions via a secure connection and/or process.

Figure 7:
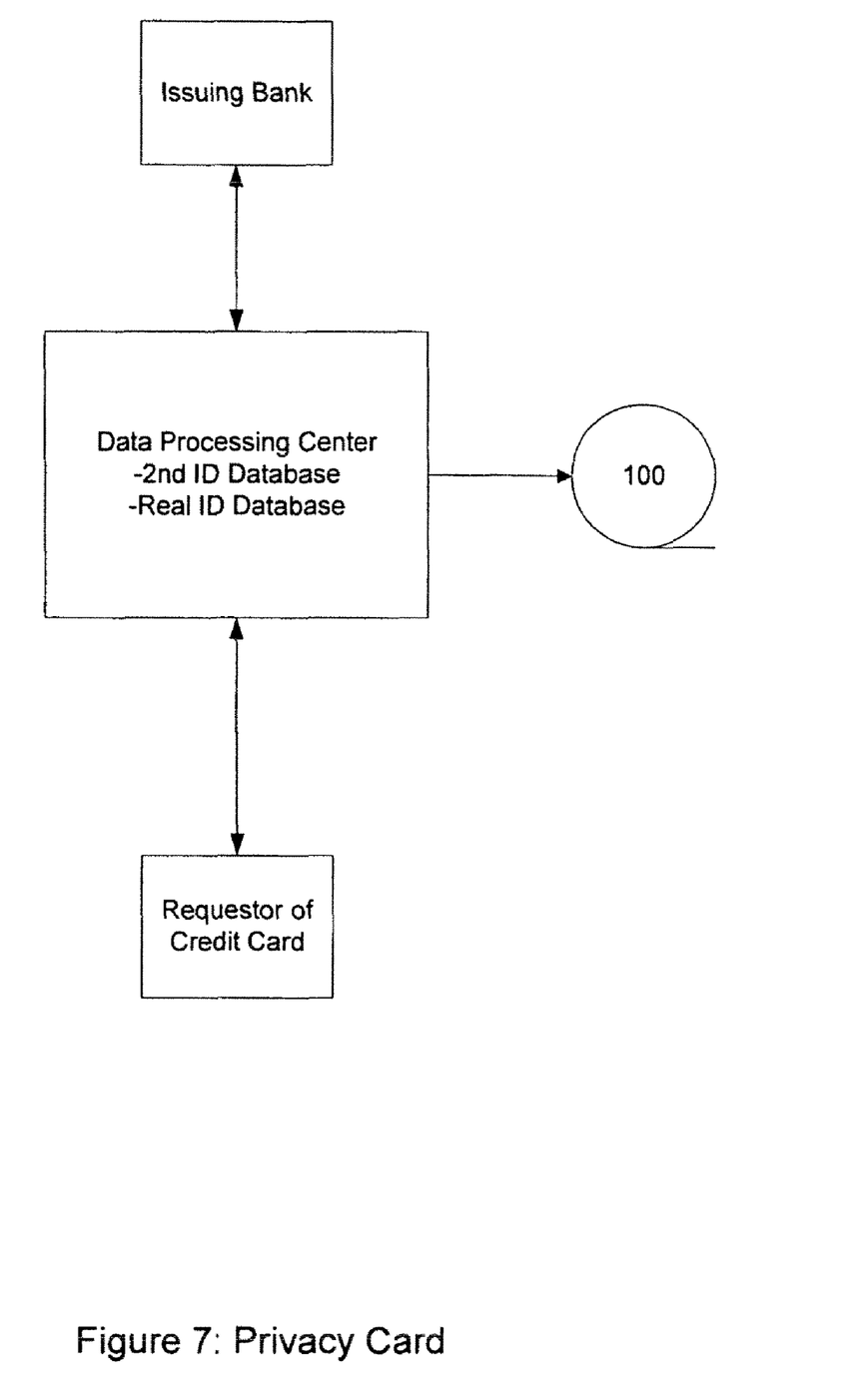
FIG. 7 is a schematic diagram illustrating the exemplary system or network for processing requests for credit according to the invention.

FIG. 7 is an exemplary illustration of another embodiment of the invention in which the requestor is requesting a credit card with the information contained in the credit card is the requestor's secondary identification. In FIG. 7, the requestor sends a communication to the data processing center 102 to obtain a credit card with said secondary identification. The data processing center 102 sends communication to the credit card issuing bank to obtain approval for a credit card. Simultaneously or subsequently, the data processing center obtains a secondary postal address, email, and phone number as discussed previously. Upon approval of credit, the data processing center 102 transmits a copy of requestor's secondary identification along with the approval of credit via secure connection and/or process.

Figure 8:
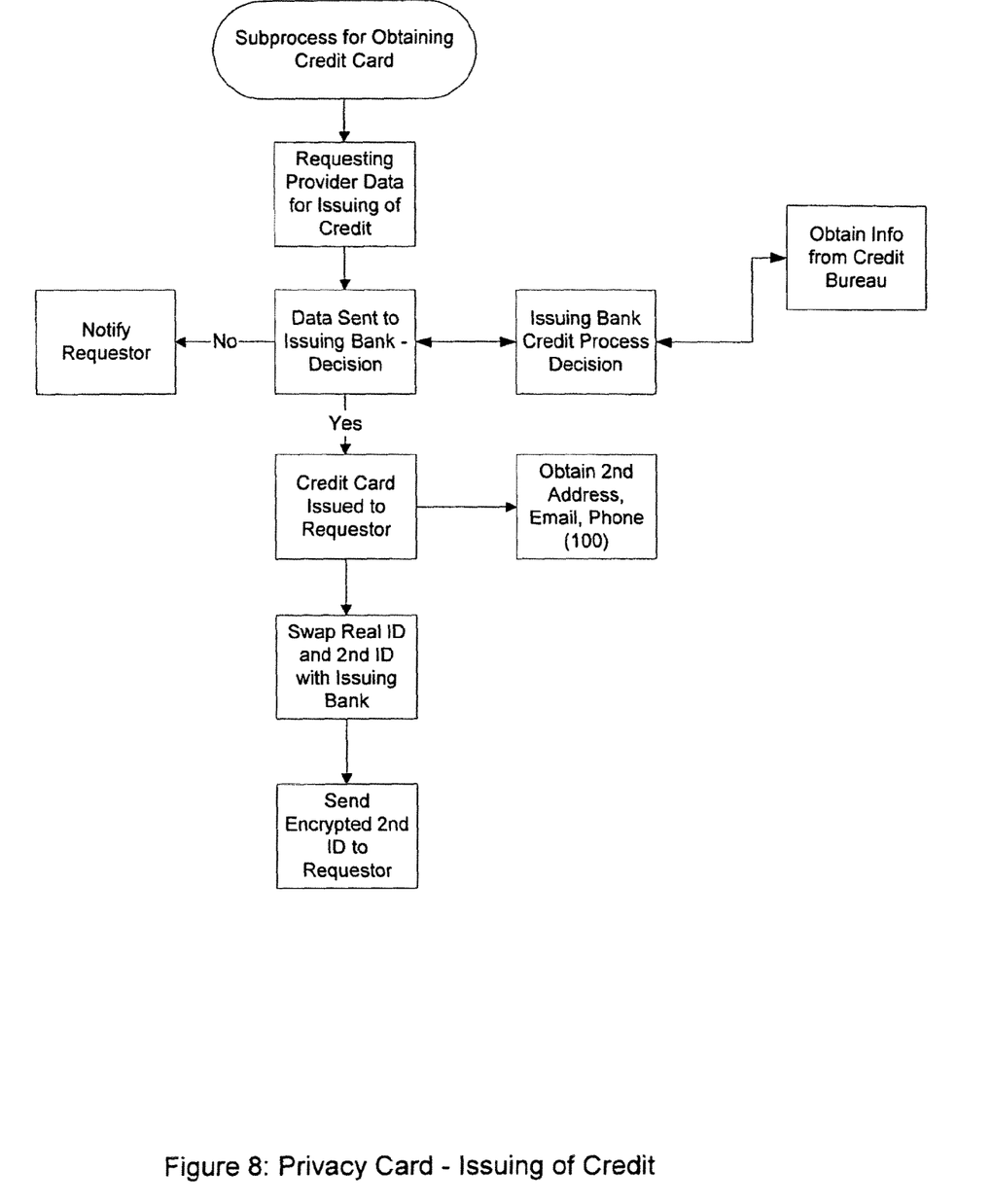
FIG. 8 is a flow diagram depicting an exemplary process which requests for credit may be processed.

The data processing center swaps with the credit issuing bank the primary identification and secondary identification. Thus, the requestor's privacy credit card contains only the secondary identification and none of the requestor's primary identification. FIG. 8 illustrates the process in a detailed form.

As illustrated in FIG. 8, a flow diagram depicting an exemplary process for obtaining a credit card containing the secondary identification of the requestor. In the first step, the requestor provides data required by the credit issuing bank to process the application for credit approval. The data required may be the requestor's social security number, birth date, address, email address, phone number, driver license number, or any other identifying information needed by the credit issuing bank, which includes one or more of the listed identifying information previously described. The requestor transmits the above-mentioned data to the data processing center 102.

The data processing center 102 receives the requestor's primary data via internet or other form of communication. The data processing center 102 transmits the primary data to the credit issuing bank. The credit issuing bank processes the application with the supplied primary data information provided by the requestor. The credit issuing bank then either approves or rejects the credit application and transmits the approval or denial of said application to the data processing center 102 for further processing.

If the credit issuing bank rejects requestor's application for credit, the data processing center 102 transmits the notice of rejection to the requestor and the transaction is terminated.

If the credit issuing bank approves the requestor's application for credit, the data processing center then processes the requestor's primary identification to obtain a secondary identification as discussed above. The data processing center 102 transmits the primary identification data, i.e. postal address, email, and phone number, to sub-process 200. The primary identification and secondary identification are stored in association with one another.

The data processing center 102, then swaps the requestor's primary identification with the requestor's secondary identification in the credit issuing bank's database. If the credit issuing bank's database is capable of storing both the primary and secondary identification of the requestor, both is identifications may be stored at the credit issuing bank's database. If the above scenario, the credit issuing bank will set the requestor's secondary identification as the primary identification on the credit card.

In another scenario, in which the credit issuing bank's database can not store both the primary and secondary identification, the data processing center 102 will swap the requestor's primary identification stored in the credit issuing bank's database with the requestor secondary identification.

Upon completion of the transmission of the requestor's secondary identification to the credit issuing bank, the credit card is issued to the requestor. The data processing center 102 than transmits the secondary identification via secure connection and/or process.

The secondary identification created for those obtaining a privacy credit card have the same options and choices as previously detailed above in the secondary identification description. In addition, the privacy credit card also consists of a transaction privacy feature if elected by the requestor. This feature allows the requestor to obtain the billing statement of the credit card by electronic means in which the only information transmitted is the total bill with none of the billing statements transactions included. The requestor may log into the credit card account, if the requestor so chooses, to obtain the transaction history for said billing period.

What is claimed as new and desired to be protected by Letter Patent of the United States is:

1. A computer-implemented method performed by a computer system for creating transaction privacy, comprising the steps of:
   receiving a request for issuance of a credit card, where the request includes personal data transmitted over a network;
   creating an identification code for the request;
   associating the identification code with the request and the personal data transmitted over the network;
   creating a secondary identification and linking the secondary identification to the personal data transmitted over the network;
   sending the personal data to a credit agency;
   receiving credit information from the credit agency;
   processing the credit information to determine whether to authorize the issuance of the credit card; and,
   authorizing the issuance of the credit card bearing the secondary identification and not bearing the personal data.

2. The method of claim 1, further comprising the step of issuing the credit card with the secondary identification.

3. The method of claim 1, further comprising the step of issuing a credit card statement with only the total sum due for all transactions.

4. The method of claim 1, wherein the secondary identification comprises: a secondary telephone number, a secondary email address, a secondary postal address, or other secondary identifier.

5. A non-transitory computer-readable memory having computer-executable instructions for instructing a computer processor of a server apparatus to perform the steps of:
   receiving a request for the issuance of a credit card, where the request includes personal data transmitted over a network, the personal data including a personal identification;
   creating an identification code for the request;
   associating the identification code with the request and the personal data transmitted over the network;
   creating a secondary identification and linking the secondary identification to the personal data transmitted over the network;
   sending the personal data to a credit agency;
   receiving credit information from the credit agency;
   processing the credit information to determine whether to issue the credit card; and,
   authorizing the issuance of the credit card bearing the secondary identification and not the personal identification.

6. A computer server apparatus for processing requests for secondary identifications, the apparatus comprising: one or more processors; and memory, wherein one or more programs are stored in the memory, the one or more programs comprising instructions to:
   receive a request for the issuance of a credit card, where the request includes personal data transmitted over a network;
   create an identification code for the request;
   associate the identification code with the request and the personal data transmitted over the network;
   create a secondary identification and link the secondary identification to the personal data transmitted over the network;
   send the personal data to a credit agency;
   receive credit information from the credit agency;
   process the credit information to determine whether to issue the credit card; and,
   authorize the issuance of the credit card with the secondary identification and not the personal data.

* * * * *